Jan. 20, 1970 W. STOORVOGEL 3,491,360
STAGGERED PULSE REPETITION FREQUENCY RADAR PROVIDING
DISCRIMINATION BETWEEN FIRST AND SECOND RETURNS
Filed Sept. 11, 1968 4 Sheets-Sheet 1

INVENTOR
WILLEM STOORVOGEL
BY
AGENT

United States Patent Office 3,491,360
Patented Jan. 20, 1970

3,491,360
STAGGERED PULSE REPETITION FREQUENCY RADAR PROVIDING DISCRIMINATION BETWEEN FIRST AND SECOND RETURNS
Willem Stoorvogel, Hengelo, Overijssel, Netherlands, assignor to N.V. Hollandse Signaalapparaten, Hengelo (Overijssel), Netherlands, a firm of the Netherlands
Filed Sept. 11, 1968, Ser. No. 758,965
Claims priority, application Netherlands, Sept. 13, 1967, 6712495
Int. Cl. G01s 7/28
U.S. Cl. 343—17.1                           10 Claims

ABSTRACT OF THE DISCLOSURE

A radar system has a transmitter which has a pulse repetition rate that alternates between two values with every pulse transmitted. The receiver will receive the echos and convert them to video signals. The receiver has an interference suppression unit, comprising means for variably delaying the video signals, a timing circuit producing timing signals having a given time relationship to the transmitter trigger pulses, control means which in response to the timing signals control the delay introduced by said delay means to be alternately of said two different durations and a gate for combining the delayed signals with the directly received signals so as to pass selected signals only.

---

The present invention relates to pulse radar apparatus, comprising a transmitter arranged to transmit short duration pulses of microwave energy, the interval between the transmitted pulses being alternately of two different durations T and $T+\Delta T$ and receiving means producing video signals in response to received signals such as first returns, second returns and asynchronous interferences signals, if any. Briefly, first returns or FR-signals are signals which are responses from targets at a shorter range than that corresponding to the pulse repetition period, whereas second returns or SR-signals are signals which are responses from targets at a greater range than that corresponding to the pulse repetition period.

Radar apparatus of the above type, having a staggered pulse repetition frequency, are known and permit detection of targets at long ranges owing to the fact that the staggered pulse repetition frequency renders it possible to discriminate between first and second returns, since the first return signals remain in one and the same position on successive sweeps, whereas the second returns appear at alternate position on successive sweeps. As the maximum range of such a radar apparatus is no longer limited by the pulse repetition frequency, the latter can be chosen to be adequately high to provide the required average of transmitted power. In the known apparatus, use is made of a cancellation circuit which cancels the first returns and permits the second returns to be passed to the utilization means. In practice, however, this prior art method is not altogether satisfactory, because all asynchronous interference signals will be passed as well. Moreover, in practice it may be desired to apply the first returns to other utilization means.

The invention, therefore, has for its object to provide a radar apparatus of the kind set forth, in which the first returns and/or second returns can be selected by simple means and in which all asynchronous interference signals are suppressed both in the selection of first returns and in the selection of second returns.

According to the invention the above object is achieved by providing a radar apparatus of the type set forth with an interference suppression unit, comprising means for delaying the said video signals, a timing circuit producing timing signals having a given time relationship to the transmitter trigger pulses, control means which in response to the timing signals control the delay introduced by said delay means to be alternately of said two different durations and means for combining the delayed signals with the directly received signals so as to pass corresponding signals only.

The invention and its advantages will be described with reference to the accompanying drawings, in which.

Figure 1:
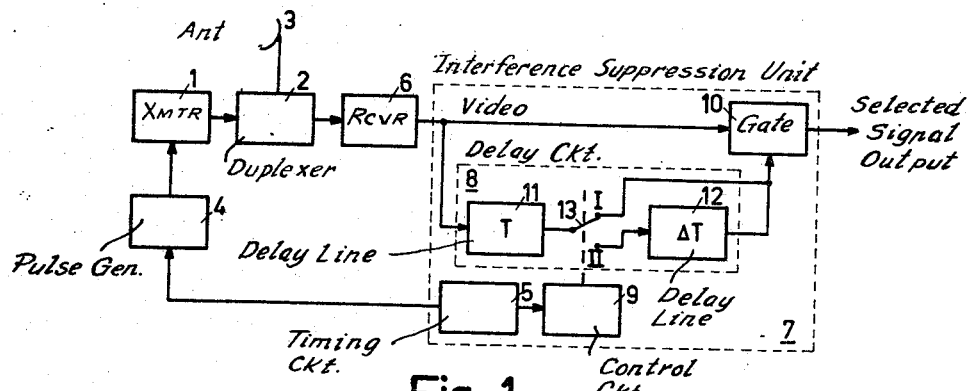
FIG. 1 is a basic circuit arrangement for illustrating the principle of the invention.

FIG. 1 shows a radar apparatus in which there is provided a pulse transmitter 1, which feeds short pulses of microwave energy via a duplexer 2 to a directional antenna 3. The duration and the moment of occurrence of the transmitted pulses are determined by the output pulses of a trigger pulse generator 4. The latter produces trigger pulses under the control of a time circuit 5, in such a way that the time spacing between the transmitted pulses is alternately of two different durations T and $T+\Delta T$, the difference between these time intervals $\Delta T$ being greater than the pulse duration but small compared with T. The transmitted pulses and the echo signals and/or any interference signals received by the antenna 3 are illustrated in the graphical diagram of FIG. 2a. In this time diagram the transmitted pulses are illustrated as full lines, the received signals either as full lines or as broken lines and the interference signals are represented by triangular pulses. Thus, at 20, 21, 22 and 23 a sequence of four transmitted pulses is shown, in which the time interval between the successive pulses are alternately T and $T+\Delta T$. If an echo from a target is returned at a time $t_1$ (less than T) after the transmitted pulse, such a return echo would occur at the times indicated by the pulses, 24, 25, 26 and 27 in FIG. 2a. These pulses are illustrated as full lines. They are usually termed FR-signals or first return signals. A return echo received from a target at a greater range than that corresponding to the pulse repetition period, that is to say at a time $t_2$ after the transmitted pulse where $t_2$ is greater than $T+\Delta T$, will occur at the times indicated, for example, by the pulses 28, 29, 30, which represent echoes which occur in response to the transmitted pulses 20, 21 and 22 respectively. The pulses 28, 29 and 30 are illustrated as broken lines. They are usually termed SR-signals or second return signals. An echo received from a target at a greater range than that corresponding to the pulse repetition period, that is to say at a time $t_3$ after the transmitted pulse, where $t_3$ is greater than T but smaller than $T+\Delta T$, will occur at the times indicated, for example, by the pulses 31, 32, 33 and 34, which are echoes occurring in response to the transmitted pulses 20, 21, 22 and 23 respectively. It should be noted that the echo pulses 31 and 33 are SR-signals, which alternate with the echo pulses 32 and 34, which are FR-signals of the same target as the echo pulses 31 and 33. The signals which occur at the times indicated, for example, by the pulses 35, 36, 37 and 38 are asynchronous interference signals. Said echo signals and said interference signals as received by the antenna 3 are fed through duplexer 2 to a receiver 6, which produces video signals in response thereto.

A particularly effective and generally advantageous arrangement is obtained in accordance with the invention by providing the radar apparatus with at least one interference suppression unit 7, comprising means 8 for delaying the said video signals, control means 9 for controlling the delay introduced to be alternately of said two different durations T and $T+\Delta T$ in response to a timing signal having a predetermined time relationship with respect to the transmitter trigger pulses, and means 10, for combining the delayed signals with the directly applied signals so as to pass corresponding signals only.

In the arrangement shown in FIG. 1 the delay means 8 comprises a first delay line 11 whose delay time T is equal to the shorter interval between the transmitted pulses and a second delay line 12 whose delay time $\Delta T$ is equal to the difference between two successive time intervals of the transmitted pulses. The video signal output of receiver 6 is fed directly to the combining means 10 and is also fed to the input of the first delay line 11. The output from this delay line is fed to a switch 13, having a first switching position I and a second switching position II. Depending on whether the switch is in its first or its second switching position the output from delay line 11 is fed either directly or via the second delay line 12 to the combiner 10. The latter combines the output delayed by the delay line 11 or by the combined delay lines 11 and 12 with the signals received directly from the receiver 6. The combiner is constituted by a gate circuit arranged so as to pass a directly rerecived signal only if it arrives simultaneously with a delayed signal. The switch 13, which is preferably an electronic switch, is controlled by a switch control unit 9. This unit effects a switching operation each time on receipt of a timing signal having a predetermined time relationship with respect to the transmitter trigger pulses. To this end the timing circuit 5 is arranged to produce a first sequence of pulses such as the pulses 47, 48, 49, 50 and 51 in FIG. 2b and a second sequency of pulses such as the pulses 52, 53, 54 and 55 of FIG. 2c. From FIG. 2b and 2c it may be seen, that the interval between the pulses in each one of said pulse sequences is alternately of two different durations T and $T+\Delta T$, and further that the time relationship of the pulses of said first sequence of pulses with respect to the pulses of said second sequence of pulses is such that the pulses (such as 48 and 50 of FIG. 2b) which occur at the commencement of a long interval $T+\Delta T$ in said first sequence coincide with the pulses (such as 52 and 54 in FIG. 2c) which occur at the commencement of a short interval T in said second sequence. In the timing circuit 5 this time relationship may be obtained by feeding the pulses of said first sequence of pulses through a delay line having a delay time T equal to the said shorter interval between pulses, whereby at the output of this delay line appear the pulses of the second sequence of pulses. The pulses of said first sequence (FIG. 2b) are fed as a timing signal to the trigger pulse generator 4. The pulses of said second sequence (FIG. 2c) are fed as a timing signal to the switch control unit 9. The timing of the transmitted pulses and the timing of the switching operations as determined by the said separate sequences of timing pulses allow two different modes of operation.

In the first mode of operation said separate sequences of timing pulses control the transmitter 1 and the switch 13 in a manner such that the signals received during a short interval between transmitted pulses are delayed the shorter delay time T and the signals received during a long interval between transmitted pulses are delayed the longer delay time $T+\Delta T$.

In the second mode of operation the said separate sequences of timing pulses control the transmitter 1 and the switch 13 so that the signals received during the shorter interval between transmitted pulses are delayed the longer delay time $T+\Delta T$ and the signals received during a long interval between transmitted pulses are delayed the shorter delay time T.

It follows that by applying the first mode of operation, only the FR-signals of successive radar sweeps will correspond in time at the inputs of the gate circuit 10, whereas by applying the second mode of operation, only the SR-signals will correspond in time at the inputs of said gate circuit 10. This may be illustrated with reference to FIG. 2e. If FIG. 2b illustrates the sequence of timing pulses 47 to 51 controlling the timing of the transmitted pulses and FIG. 2c illustrates the sequence of timing pulses 52 to 55 controlling the switching operation, it will be apparent that the pulses 52 to 55 may control the alternate positions of the switch to be either in accordance with the order of succession illustrated in FIG. 2d or in acordance with the order of succession illustrated in FIG. 2e. Therefore, it is the order of succession chosen which determines whether the arrangement functions in accordance with the first or the second mode of operation. If the order of FIG. 2d is chosen, the arrangement operates in the first mode, in which the signals received during a short interval between transmitted pulses are delayed the shorter delay time T and the signals received during a long interval between transmitted pulses are delayed the longer delay time $T+\Delta T$. If, on the other hand, the order of FIG. 2e is chosen, the arrangement operates in the second mode, in which the signals received during a short interval between transmitted pulses are delayed the longer delay time $T+\Delta T$ and the signals received during a long interval between transmitted pulses are delayed the shorter delay time T.

Figure 2:
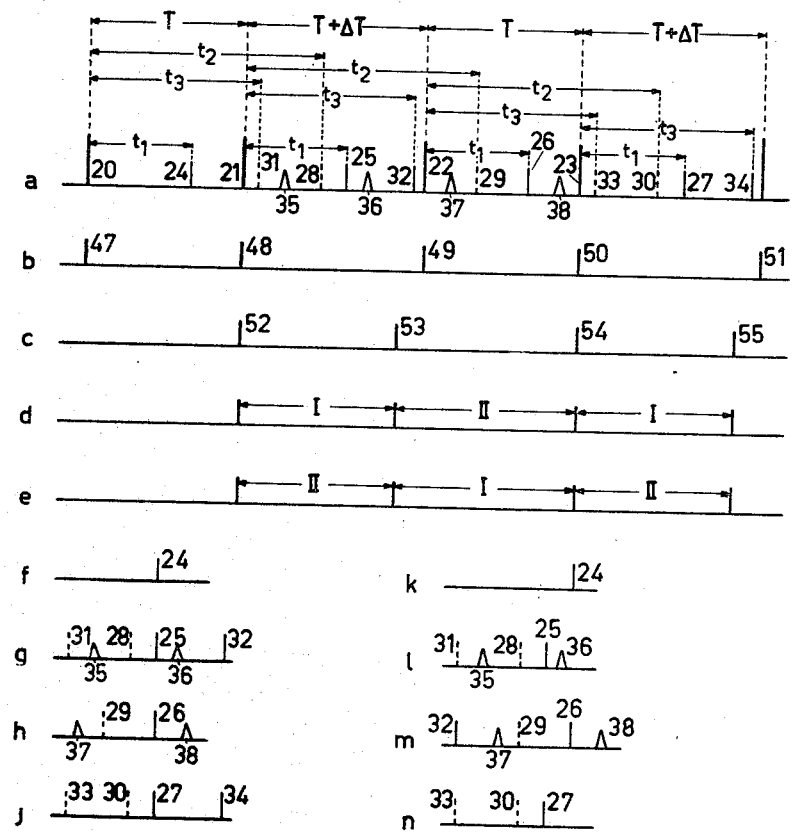
FIG. 2 is a graphical diagram showing the times at which pulses are transmitted and echoes received.

Turning now to FIG. 2a it may be seen that:

(a) the time spacing between an FR-signal (such as 26) received at a time $t_1$ during a short interval T and an FR-signal (such as 27) received at the time $t_1$ during a subsequent long interval $T+\Delta T$, is equal to $T-t_1+t_1=T$, whereas the time spacing between an SR signal (such as 29) received at a time $t_2$ during a short interval T and an SR-signal (such as 30) received at the time $t_2$ in a subsequent long interval $T+\Delta T$ is equal to $$T+\Delta T+T-t_2+t_2-T=T+\Delta T$$

and (b) the time spacing between an FR-signal (such as 25) received at a time $t_1$ during a long interval $T+\Delta T$ and an FR-signal (such as 26) received at the time $t_1$ in the subsequent short interval T is equal to $T+\Delta T-t_1+t_1=T+\Delta T$, whereas the time spacing between an SR-signal (such as 28) received at a time $t_2$ during a long interval $T+\Delta T$ and an SR-signal (such as 29), received during the subsequent short interval T is equal to $$T+(T+\Delta T)-t_2+t_2-(T+\Delta T)=T$$

The above observations may be summarized in the following general table:

| Interval | Time periods | | |
|---|---|---|---|
| | FR-signals | SR-signals | Asynchronous interference signals |
| Short | T | $T+\Delta T$ | Time period. |
| Long | $T+\Delta T$ | T | Varies. |
| Short | T | $T+\Delta T$ | At random. |
| Long | | | |

From this table it may be inferred that the order of succession in which the time spacings alternate between T and $T+\Delta T$, corresponds, in the case of FR-signals, with the delay times T and $T+\Delta T$, alternately introduced when switch 13 is operated in accordance with the first mode of operation, and corresponds, in the case of SR-signals with the delay times $T+\Delta T$ and T, alternately introduced when the switch 13 is operated in accordance with the second mode of operation. Therefore, when the first mode of operation is used, only FR-signals are allowed to pass through the gate circuit 10, since only with the with the FR-signals coincidence of the directly applied signals and the delayed signals occurs, whereas all other signals, i.e., all SR-signals and the asynchronous interference signals are rejected. Similarly, when the second mode of operation is used, only the SR-signals are allowed to pass through the gate circuit 10, since only in the case of SR-signals coincidence will occur between the directly applied signals and the delayed signals, so that also in this case all other signals, i.e., all FR-signals and the asynchronous interference signals are rejected.

Figure 3:
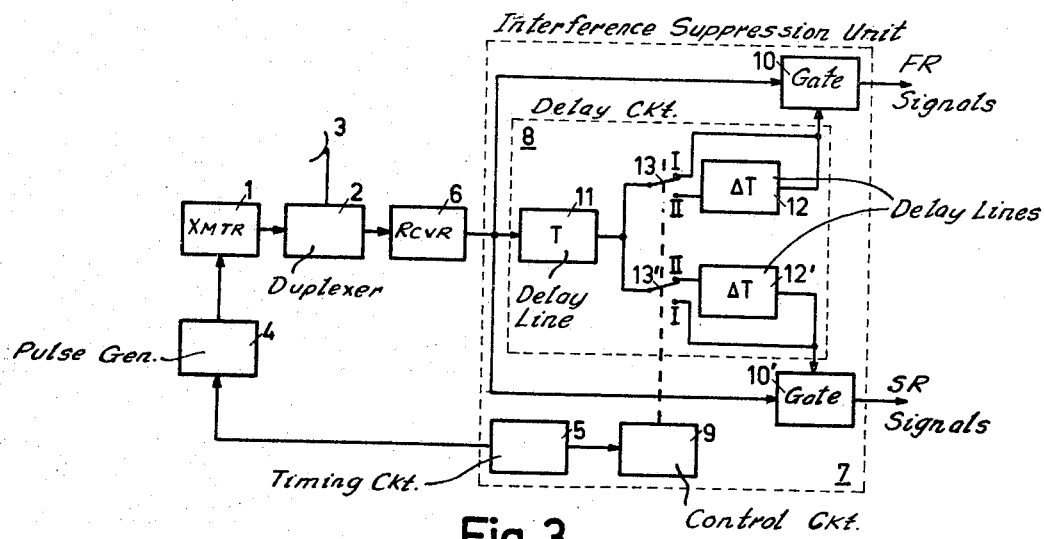
FIGS. 3, 4, 5 and 6 are circuit diagrams showing possible modifications of a radar apparatus according to the invention.

FIG. 3 shows an embodiment in which the FR-signals appear at one output and the SR-signals appear at a further output. This embodiment is substantially similar with that of FIG. 1. It differs however, in that it comprises in addition a gate circuit 10', a delay line 12' and a switch 13'. These additional elements are similar to the elements 10, 12 and 13. The video signal output of the receiver 6 is fed directly to the two gate circuits 10 and 10' and is also fed to the first delay line 11. The output of this delay line is fed to the two switches 13 and 13', which both have a first switching position I and a second switching position II. These switches apply the signal output of the delay line 11 either directly or via the second delay line 12 or 12' to the gate circuit 10 or 10' respectively. The switches 13 and 13' are simultaneously actuated by the switch control unit 9, which effects the switching operation in response to the timing signals illustrated in FIG. 2c. It should be noted that the positions of the switches 13 and 13' is such, that switch 13 is in the position I when switch 13' is in the position II and conversely. It is thus ensured that the arrangement operates simultaneously in the first and in the second mode described above, whereby gate circuit 10 passes FR-signals only and the gate circuit 10' passes SR-signals only.

Figure 4:
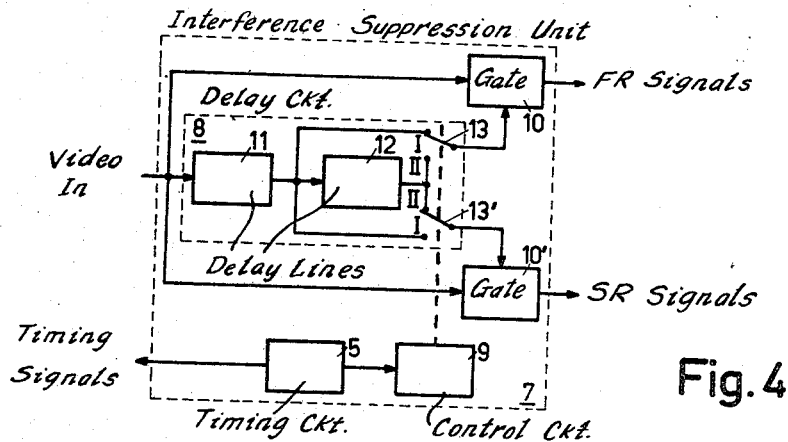
Figure 5:
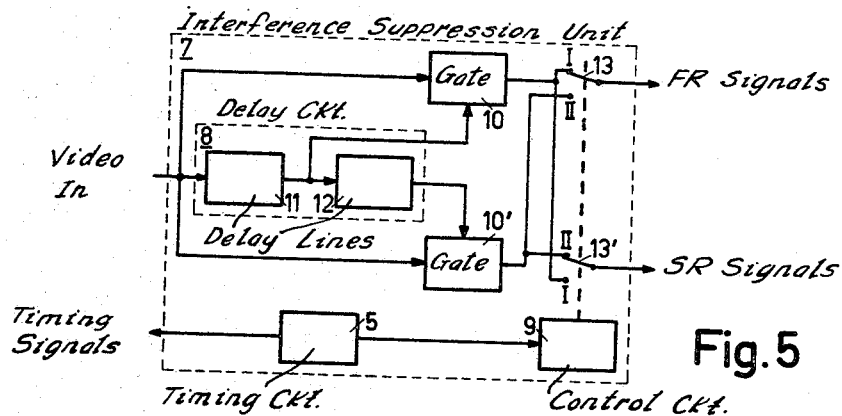

The use of an additional delay line 12' may be avoided in a simple manner by arranging the switches 13 and 13' after the delay line 12, as is shown in FIG. 4 or by arranging these switches after the gate circuits 10 and 10' in the manner shown in FIG. 5.

Referring to FIG. 2a, it may be observed that the signals 31, 32, 33 and 34 are echoes of one and the same target. As these signals occur alternately as FR-signals and as SR-signals, they are not passed by the gate circuit(s).

Figure 6:
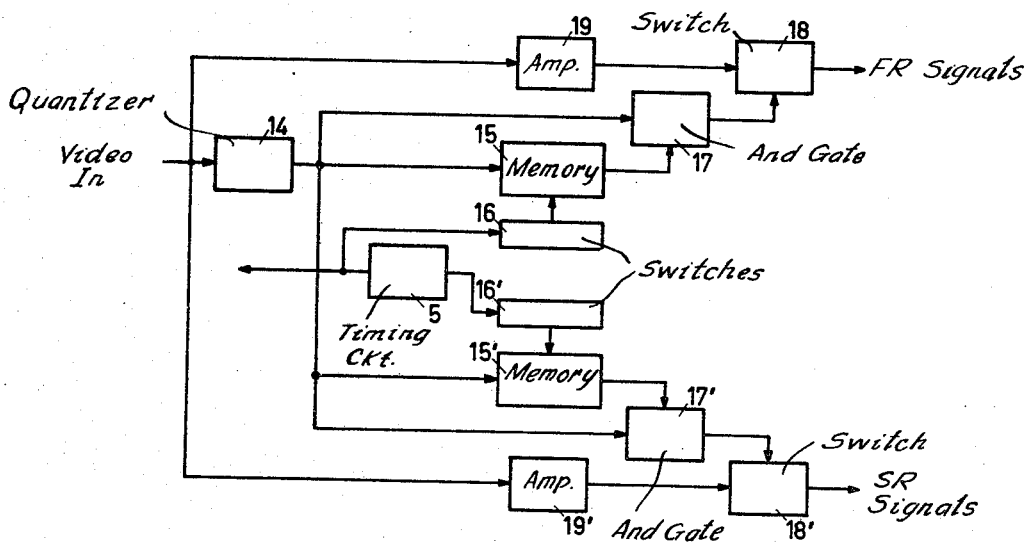

FIG. 6 shows an embodiment in which the FR-signals appear at one output and the SR-signals appear at a further output, whilst by introducing the delay in a different way, it is achieved that the signals appearing alternately as FR-signals and as SR-signals are invariably treated as SR-signals, so that they appear at the SR-signal output. In this embodiment the required delay is introduced with the aid of a digital memory divided into two equal portions. The video signal output of the receiver 6 is fed to this memory through a quantizer 14. The two memory portions 15 and 15' in this embodiment consist of one store line each. These store lines each comprise $n$ bistable elements corresponding to a division of the radar range in $n$ equal range increments. The control unit is constituted by two separate groups of electronic switching means 16 and 16' associated with said store lines. These switching means operate in response to the timing signals to effect the writing into said store lines of the quantised video signals applied thereto and the reading-out of the previously stored video signals. Since in this embodiment each one of the two memory portions comprises only one store line, each bistable element of a store line is read-out a fraction of time prior to the reception of a signal to be written-in. In this embodiment the gate circuit comprises at least two "and"-gates 17 and 17', to which the quantized signals appearing at the output of the quantizer are directly applied. The two "and"-gates are controlled by the output signals of the digital memory so that the directly applied signals are passed only when at the same time an output signal of the memory appears. The quantized video signals appearing at the outputs of the "and"-gates 17 and 17' are suitable for direct use as radar information in a digital computer. If video display is desired, the quantized video output signal of the gate circuits 17 and 17' may be employed for actuating the switches 18 and 18' so as to pass the corresponding non-quantized video signal of the receiver video output, which is fed to said switches via the amplifiers 19, 19'.

When the pulses of the first sequence of pulses (FIG. 2b) are applied as timing signals to the first group of switching means 16, the time relationship between the directly applied signals and the delayed signals is as shown in FIGS. 2f, g, h and j. It will be seen from these diagrams that only the FR-signals 24, 25, 26 and 27 are passed. When the pulses of the second sequence of pulses (FIG. 2c) are applied as timing signals to the second group of switchingmeans 16', the time relationship between the directly applied signals and the delayed signals is as shown in FIGS. 2k, l, m and n and it will be apparent from these diagrams that the SR-signals, e.g. 28, 29 and 30 are passed, whilst in addition the signals appearing alternately as FR-signals and SR-signals, e.g., 31, 32 and 33 are passed as SR-signals.

Instead of using one store line for each memory portion, each one of the two memory portions may be equipped with two store lines, so that one store line may be written-in when the other line is read-out, and conversely.

Finally, it may be observed, that a digital memory as applied in the embodiment of FIG. 6, could also be used for introducing the required delay in the embodiment of FIGS. 1, 3, 4 and 5.

What I claim is:

1. A radar apparatus comprising a transmitter arranged to transmit short duration pulses of microwave energy, the intervals between transmitted pulses being alternately of two different durations T and $T+\Delta T$, and a receiver producing video signals in response to received signals such as first returns, second returns and asynchronous interference signals, if any, wherein an interference suppression unit comprising means for delaying the said video signal, a timing circuit producing timing signals having a given time relationship to the transmitter trigger pulses, control means which in response to said timing signals control the delay introduced by said delay means is to be alternately of said two difference durations and means for providing an output signal which is selectively indicative of one of said returns in accordance with the delay of said delay means.

2. A radar apparatus as claimed in claim 1, wherein the timing circuit is arranged to produce a first sequence of pulses and a second sequence of pulses, the intervals between successive pulses in each one of said first and second pulse sequences being alternately equal to said two different durations T and $T+\Delta T$, the time relationship of said first sequence of pulses to the pulses of said second sequence of pulses being such that the pulses occurring at the commencement of a long interval $T+\Delta T$ in said first sequence coincide with the pulses occurring at the commencement of a short interval T in said second sequence.

3. A radar apparatus as claimed in claim 2, wherein the pulses of said first sequence of pulses are applied as timing signals to the transmitter trigger pulse generator and the pulses of said second sequence of pulses are applied as timing signals to said control means.

4. A radar apparatus as claimed in claim 1, wherein the said control means in response to the applied timing signals varies the delay introduced so that the shorter duration delay is applied to video signals occurring during the short interval between transmitted pulses whereas the longer duration delay is applied to video signals which occur during the long interval between transmitted pulses, whereby the signals passed by said combiner are first return signals only.

5. A radar apparatus as claimed in claim 1, wherein the said control means, in response to the applied timing signals, varies the delay introduced so that the longer duration delay is applied to video signals occurring during the short interval between transmitted pulses whereas the shorter duration delay is applied to video signals occurring during the long interval between transmitted pulses, whereby the signals passed by said combiner are second returns only.

6. A radar apparatus as claimed in claim 2, wherein the delay means are constituted by a digital memory comprising at least two equal memory portions of $n$ bistable elements corresponding with a division of the total radar range into $n$ range increments and wherein the said control means are constituted by two separate groups of electronic switching means, a quantizer and means for feeding the video signals by way of said quantizer to the input of said digital memory and means for operatively connecting the said control means so as to control the writing-in and reading-out of said memory in response to the said timing signals.

7. A radar apparatus as claimed in claim 6, wherein the pulses of said first sequence of pulses are fed as a timing signal to one group of electronic switching means whilst the pulses of said second sequence of pulses are fed as a timing signal to said other group of electronic switching means and wherein the said combining means comprise two "and"-gates to which the directly received quantized video signals and the quantized video signals read from the respective store portions are applied whereby one of these "and"-gates passes first return signals only and the other "and"-gate passes second returns only.

8. A radar apparatus as claimed in claim 1 wherein said providing means comprises a gate controlled by said delay means.

9. A radar apparatus as claimed in claim 1 wherein said delay means comprises first and second delay lines.

10. A radar apparatus as defined in claim 9 wherein said control means comprises a switch.

References Cited

UNITED STATES PATENTS

| | | | |
|---|---|---|---|
| 3,066,289 | 11/1962 | Elbinger | 343—7.7 |
| 3,169,243 | 2/1965 | Kuhrdt | 343—7.7 |
| 3,273,147 | 9/1966 | Herscovici | 343—7.7 |

RICHARD A. FARLEY, Primary Examiner